United States Patent
Kyriazakos et al.

(10) Patent No.: US 11,922,554 B2
(45) Date of Patent: Mar. 5, 2024

(54) COMPUTERIZED SYSTEM AND METHOD FOR CLOUD-BASED CONTENT CREATION, ENHANCEMENT AND/OR RENDERING

(71) Applicant: YAHOO AD TECH LLC, Dulles, VA (US)

(72) Inventors: Victor Kyriazakos, Athens (GR); Eugen Fialcovschi, Hoofddorp (NL); Christos Papapavlou, Patras (GR); Ben Skinner, Sydney (AU); Zeda Stone, Laguna Beach (CA); Herve Bizira, View Park (CA)

(73) Assignee: YAHOO AD TECH LLC, New York, NY (US)

( * ) Notice: Subject to any disclaimer, the term of this patent is extended or adjusted under 35 U.S.C. 154(b) by 0 days.

(21) Appl. No.: 17/492,724

(22) Filed: Oct. 4, 2021

(65) Prior Publication Data
US 2023/0104046 A1 Apr. 6, 2023

(51) Int. Cl.
*G06T 15/00* (2011.01)

(52) U.S. Cl.
CPC .................................. *G06T 15/00* (2013.01)

(58) Field of Classification Search
CPC .... G06F 3/0482; G06F 40/143; G06F 40/186; G06F 40/103; G06F 16/9577; G06F 3/04842; G06F 3/04845; G06F 3/04847; G06T 11/60; G06T 19/00; G06T 15/00
See application file for complete search history.

(56) References Cited

U.S. PATENT DOCUMENTS

2021/0067609 A1\* 3/2021 Judd ....................... H04L 67/01

\* cited by examiner

*Primary Examiner* — Hau H Nguyen
(74) *Attorney, Agent, or Firm* — James J. DeCarlo; Greenberg Traurig, LLP

(57) ABSTRACT

The disclosed systems and methods provide a cloud-based framework for the creation and/or enhancement of high quality media content for dissemination over a computerized network. The disclosed framework is configured to operate in accordance with at least one of a content creation, content enhancement and/or rendering template. Such templates can function as rules engines that call specific types of ML or AI algorithms or routines that modify the input data according to the type of template being used. Thus, the disclosed framework can be utilized for creating new high-quality media, improving upon existing media and/or reformatting media for rendering upon dissemination.

19 Claims, 6 Drawing Sheets

COMPUTERIZED SYSTEM AND METHOD FOR CLOUD-BASED CONTENT CREATION, ENHANCEMENT AND/OR RENDERING

This application includes material that is subject to copyright protection. The copyright owner has no objection to the facsimile reproduction by anyone of the patent disclosure, as it appears in the Patent and Trademark Office files or records, but otherwise reserves all copyright rights whatsoever.

FIELD

The present disclosure relates to the creation of high quality media content via a cloud-based application program interface (API) service, program or platform.

BACKGROUND

Current content creation platforms require users to manipulate each feature or attribute of the content that is being created or modified prior to its distribution over a network. Such platforms are traditionally application-based, in that they are localized to each creator's device and require users to locally create, modify, manage and upload their content to desired locations.

SUMMARY

The present disclosure provides a framework for a cloud-pipeline of data-driven, templated content creation, enhancement and rendering. The disclosed cloud-based media creation and enhancement framework can be equipped with varying API tools for the creation, enhancement and rendering of high quality content, whereby the cloud-based framework can facilitate the dissemination of such content over a network to a variety of users and/or network locations.

According to some embodiments, as discussed in more detail below, the disclosed systems and methods leverage particular types of templates that correspond to the creation of new content, the enhancement of existing content and/or the modified rendering of existing content. For purposes of this disclosure, such templates can be referred to as i) content creation templates, ii) content enhancement templates, and iii) rendering templates, respectfully.

According to some embodiments, each type of template is configured with a plurality of specific types of input fields that are to receive input data that corresponds to the type of template. For example, a content enhancement template can be configured with input fields to receive data related to how a media rendering is to be formatted, and/or how its visual appearance is to be displayed and/or animated. Thus, the input data can be modified so as to enhance a display feature from an original or existing display feature (e.g., improve the brightness or sharpness of a virtually displayed item across image frames of a video, for example).

As discussed below, the templates can function as rules engines that call specific types of machine learning (ML) or artificial intelligence (AI) programs, algorithms or routines that use, modify and/or manipulate the input data according to the type of template being used. In some embodiments, the ML/AI programs, algorithms or routines can be stored in network containers (e.g., using Docker® or Kubernetes®, for example) which can be referenced and/or called via instructions executable from the templates. In some embodiments, such ML/AI programs, algorithms or routines can be defined as sub-templates within a template's hierarchical structure. According to some embodiments, the ML/AI programs, algorithms or routines referenced by the sub-templates can include any type of known or to be known image processing and/or computational analysis algorithm, technique or technology, such as, but not limited to, computer vision, neural networks, image classifiers, and the like.

In some embodiments, content creation templates are utilized for receiving, as input, a variety of types of input data values, objects or items, and creating a media rendering accordingly. In some embodiments, the input data for the creation template can include, but is not limited to, HEX values, text, numbers, Booleans, pointers to content, uniform resource locators (URLs), images, video files, audio files, and the like, or some combination thereof. As discussed herein, the created media object can be any type of content or media, such as, but not limited to, an image, video and/or multimedia, whether in a two-dimensional (2D) format or three-dimensional (3D) format, the like, or some combination thereof.

In some embodiments, content enhancement templates can be utilized to improve upon an existing piece of media that is provided as input. According to some embodiments, templates of the content enhancement type can be configured to enable the modification of parameters of content that include, for example, but are not limited to, resolution, realism, texture, intensity, colors, and/or any other type of content attribute or characteristic of a displayed media object. As discussed herein, the enhanced media object can be any type of content or media, such as, but not limited to, an image, video and/or multimedia, in a two-dimensional (2D) format or three-dimensional (3D) format, the like, or some combination thereof.

In some embodiments, rendering templates enable the conversion of a media object from an original format to another format. For example, a media object can originally be formatted as a 3D media object, and a rendering template can cause its conversion to a 2D format. Embodiments also exist where the reverse is possible for a 2D formatting to be converted to a 3D formatting. In some embodiments, rendering templates can also exist for the modification of media objects from one media format to another—for example, from a video to an image, from JPEG to PNG, from a video to a GIF, from an image, to a thumbnail, and the like, or some combination thereof. In some embodiments, a rendering template can cause a media file to change its rendering format (e.g., JPEG to PNG) as well as its dimensional space formatting. In some embodiments, a combination or series of rendering templates can be used to achieve a similar result. According to some embodiments, the disclosed framework can use a rendering template to output media objects based upon the rendering capabilities of the destination upon which it is being shared, posted, uploaded and/or displayed.

According to embodiments of the instant disclosure, each template category is unbound by a number of templates that fall within a category. That is, there can be any number of varying types of creation, enhancement and/or rendering templates that produce varying types of content modifications to input parameters. For example, given an input parameter of HEX values, there can be an unlimited number of creation templates that modify the input HEX values in a different manner so as to create different forms, types and/or modifications of created media objects.

Thus, according to some embodiments, the disclosed framework enables content creators to author high-quality 2D or 3D experiences from data, images, videos and/or 3D inputs that can be shared with other users, posted on particular network platforms or locations and/or inserted into campaigns of content.

In accordance with one or more embodiments, the present disclosure provides computerized methods for a novel framework that creates high quality media content for dissemination over a computerized network.

In accordance with one or more embodiments, the present disclosure provides a non-transitory computer-readable storage medium for carrying out the above mentioned technical steps of the framework's functionality. The non-transitory computer-readable storage medium has tangibly stored thereon, or tangibly encoded thereon, computer readable instructions that when executed by a device (e.g., application server, messaging server, ad server, content server and/or client device, and the like) cause at least one processor to perform a method for a novel and improved framework that creates high quality media content for dissemination over a computerized network.

In accordance with one or more embodiments, a system is provided that comprises one or more computing devices configured to provide functionality in accordance with such embodiments. In accordance with one or more embodiments, functionality is embodied in steps of a method performed by at least one computing device. In accordance with one or more embodiments, program code (or program logic) executed by a processor(s) of a computing device to implement functionality in accordance with one or more such embodiments is embodied in, by and/or on a non-transitory computer-readable medium.

BRIEF DESCRIPTION OF THE DRAWINGS

The foregoing and other objects, features, and advantages of the disclosure will be apparent from the following description of embodiments as illustrated in the accompanying drawings, in which reference characters refer to the same parts throughout the various views. The drawings are not necessarily to scale, emphasis instead being placed upon illustrating principles of the disclosure.

DESCRIPTION OF EMBODIMENTS

Figure 1:
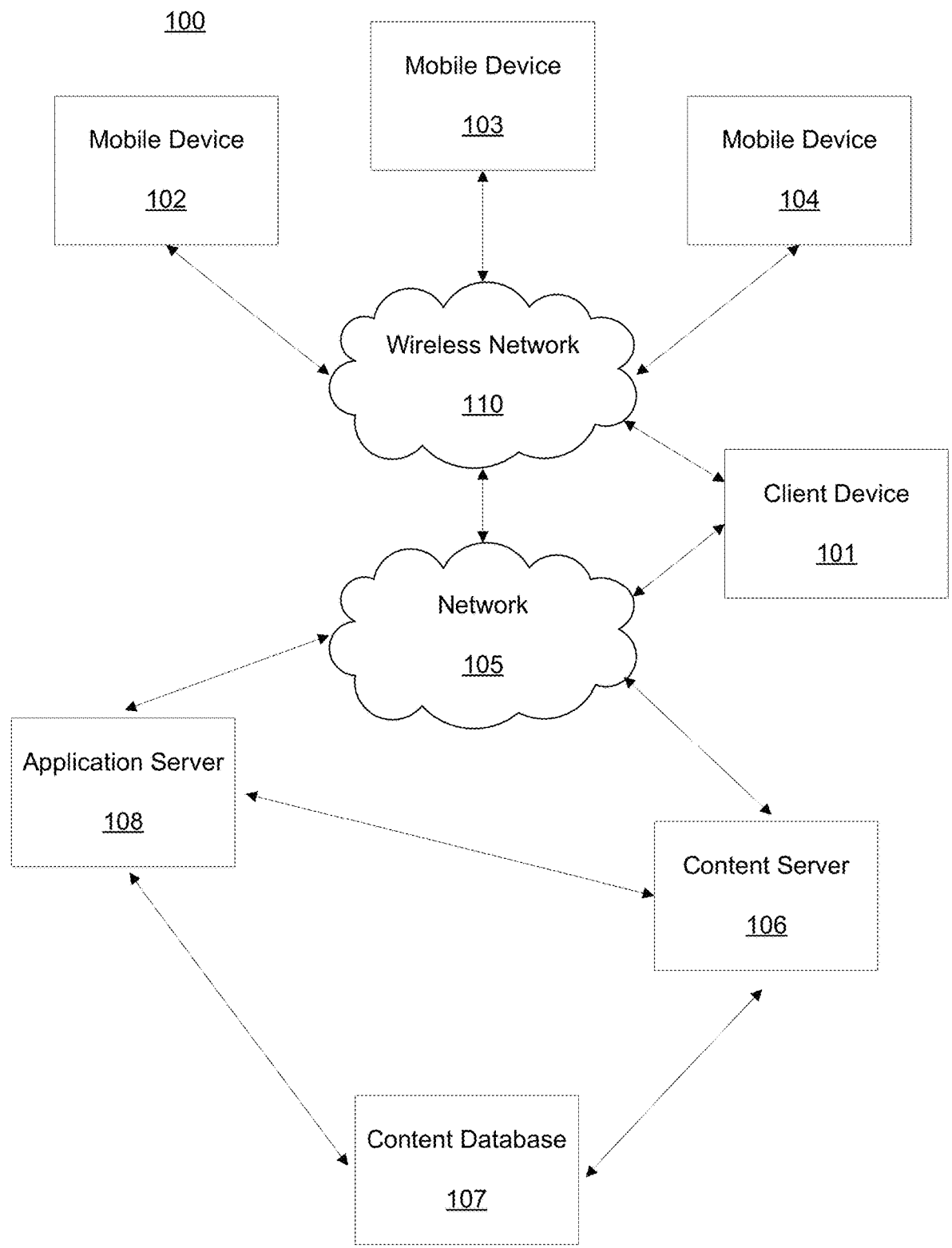
FIG. 1 is a schematic diagram illustrating an example of a network within which the systems and methods disclosed herein could be implemented according to some embodiments of the present disclosure.

The present disclosure will now be described more fully hereinafter with reference to the accompanying drawings, which form a part hereof, and which show, by way of non-limiting illustration, certain example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure is described below with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

For the purposes of this disclosure a non-transitory computer readable medium (or computer-readable storage medium/media) stores computer data, which data can include computer program code (or computer-executable instructions) that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, optical storage, cloud storage, magnetic storage devices, or any other physical or material medium which can be used to tangibly store the desired information or data or instructions and which can be accessed by a computer or processor.

For the purposes of this disclosure the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud servers are examples.

For the purposes of this disclosure a "network" should be understood to refer to a network that may couple devices so that communications may be exchanged, such as between a server and a client device or other types of devices, including between wireless devices coupled via a wireless network, for example. A network may also include mass storage, such as network attached storage (NAS), a storage area network (SAN), a content delivery network (CDN) or other forms of computer or machine readable media, for example. A network may include the Internet, one or more local area networks (LANs), one or more wide area networks (WANs), wire-line type connections, wireless type connections, cellular or any combination thereof. Likewise, sub-networks, which may employ differing architectures or may be compliant or compatible with differing protocols, may interoperate within a larger network.

For purposes of this disclosure, a "wireless network" should be understood to couple client devices with a network. A wireless network may employ stand-alone ad-hoc networks, mesh networks, Wireless LAN (WLAN) networks, cellular networks, or the like. A wireless network may further employ a plurality of network access technologies, including Wi-Fi, Long Term Evolution (LTE), WLAN, Wireless Router (WR) mesh, or 2nd, 3rd, $4^{th}$ or $5^{th}$ generation (2G, 3G, 4G or 5G) cellular technology, mobile edge computing (MEC), Bluetooth, 802.11b/g/n, or the like. Network access technologies may enable wide area coverage for devices, such as client devices with varying degrees of mobility, for example.

In short, a wireless network may include virtually any type of wireless communication mechanism by which signals may be communicated between devices, such as a client device or a computing device, between or within a network, or the like.

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like.

For purposes of this disclosure, a client (or consumer or user) device may include a computing device capable of sending or receiving signals, such as via a wired or a wireless network. A client device may, for example, include a desktop computer or a portable device, such as a cellular telephone, a smart phone, a display pager, a radio frequency (RF) device, an infrared (IR) device an Near Field Communication (NFC) device, a Personal Digital Assistant (PDA), a handheld computer, a tablet computer, a phablet, a laptop computer, a set top box, a wearable computer, smart watch, an integrated or distributed device combining various features, such as features of the forgoing devices, or the like.

A client device may vary in terms of capabilities or features. Claimed subject matter is intended to cover a wide range of potential variations, such as a web-enabled client device or previously mentioned devices may include a high-resolution screen (HD or 4K for example), one or more physical or virtual keyboards, mass storage, one or more accelerometers, one or more gyroscopes, global positioning system (GPS) or other location-identifying type capability, or a display with a high degree of functionality, such as a touch-sensitive color 2D or 3D display, for example.

As discussed herein, reference to an "advertisement" should be understood to include, but not be limited to, digital media content embodied as a media item that provides information provided by another user, service, third party, entity, and the like. Thus, for example, created and/or enhanced content (and/or modified renderings of content) can take the form of advertisements, as discussed herein. Such digital ad content can include any type of known or to be known media renderable by a computing device, including, but not limited to, video, text, audio, images, and/or any other type of known or to be known multi-media item or object. In some embodiments, the digital ad content can be formatted as hyperlinked multi-media content that provides deep-linking features and/or capabilities. Therefore, while some content is referred to as an advertisement, it is still a digital media item that is renderable by a computing device, and such digital media item comprises content relaying promotional content provided by a network associated party.

Certain embodiments will now be described in greater detail with reference to the figures. In general, with reference to FIG. 1, a system 100 in accordance with an embodiment of the present disclosure is shown. FIG. 1 shows components of a general environment in which the systems and methods discussed herein may be practiced. Not all the components may be required to practice the disclosure, and variations in the arrangement and type of the components may be made without departing from the spirit or scope of the disclosure. As shown, system 100 of FIG. 1 includes local area networks ("LANs")/wide area networks ("WANs")—network 105, wireless network 110, mobile devices (client devices) 102-104 and client device 101. FIG. 1 additionally includes a variety of servers, such as content server 106 and application (or "App") server 108.

One embodiment of mobile devices 102-104 may include virtually any portable computing device capable of receiving and sending a message over a network, such as network 105, wireless network 110, or the like. Mobile devices 102-104 may also be described generally as client devices that are configured to be portable. Thus, mobile devices 102-104 may include virtually any portable computing device capable of connecting to another computing device and receiving information, as discussed above.

Mobile devices 102-104 also may include at least one client application that is configured to receive content from another computing device. In some embodiments, mobile devices 102-104 may also communicate with non-mobile client devices, such as client device 101, or the like. In one embodiment, such communications may include sending and/or receiving messages, searching for, viewing and/or sharing memes, photographs, digital images, audio clips, video clips, or any of a variety of other forms of communications.

Client devices 101-104 may be capable of sending or receiving signals, such as via a wired or wireless network, or may be capable of processing or storing signals, such as in memory as physical memory states, and may, therefore, operate as a server.

Wireless network 110 is configured to couple mobile devices 102-104 and its components with network 105. Wireless network 110 may include any of a variety of wireless sub-networks that may further overlay stand-alone ad-hoc networks, and the like, to provide an infrastructure-oriented connection for mobile devices 102-104.

Network 105 is configured to couple content server 106, application server 108, or the like, with other computing devices, including, client device 101, and through wireless network 110 to mobile devices 102-104. Network 105 is enabled to employ any form of computer readable media or network for communicating information from one electronic device to another.

The content server 106 may include a device that includes a configuration to provide any type or form of content via a network to another device. Devices that may operate as content server 106 include personal computers, desktop computers, multiprocessor systems, microprocessor-based or programmable consumer electronics, network PCs, servers, and the like. Content server 106 can further provide a variety of services that include, but are not limited to, email services, instant messaging (IM) services, streaming and/or downloading media services, advertising services, search services, photo services, web services, social networking services, news services, third-party services, audio services, video services, SMS services, MMS services, FTP services, voice over IP (VOIP) services, or the like.

In some embodiments, content server 106 can comprise a server that stores online advertisements for presentation to users. In some embodiments, various monetization techniques or models may be used in connection with sponsored advertising, including advertising associated with user data, as discussed below, where ads can be modified and/or added to content based on information related to the recipient user(s), the content included in the messages, and/or information related to and/or provided by the message sender.

In some embodiments, users are able to access services provided by servers 106 and 108. This may include in a non-limiting example, authentication servers, search servers, email servers, social networking services servers, SMS servers, IM servers, MMS servers, exchange servers, photo-sharing services servers, and travel services servers, via the network 105 using their various devices 101-104.

In some embodiments, applications, such as, but not limited to, mail applications (e.g., Yahoo! Mail®, Gmail®, and the like), instant messaging applications, blog, photo or social networking applications (e.g., Facebook®, Twitter®, Instagram®, and the like), search applications (e.g., Yahoo!® Search), news applications (e.g., Yahoo! Sports®, ESPN®, Huffington Post®, CNN®, and the like), and the like, can be hosted by the application server 108, or content server 106 and the like.

Thus, the application server 108, for example, can store various types of applications and application related information including application data and user profile information (e.g., identifying and behavioral information associated with a user). It should also be understood that content server 106 can also store various types of data related to the content and services provided by content server 106 in an associated content database 107, as discussed in more detail below (e.g. database 320 of FIG. 3). Embodiments exist where the network 105 is also coupled with/connected to a Trusted Search Server (TSS) which can be utilized to render content in accordance with the embodiments discussed herein. Embodiments exist where the TSS functionality can be embodied within servers 106 and/or 108.

Moreover, although FIG. 1 illustrates servers 106 and 108 as single computing devices, respectively, the disclosure is not so limited. For example, one or more functions of servers 106 and/or 108 may be distributed across one or more distinct computing devices. Moreover, in one embodiment, servers 106 and/or 108 may be integrated into a single computing device, without departing from the scope of the present disclosure.

Figure 2:
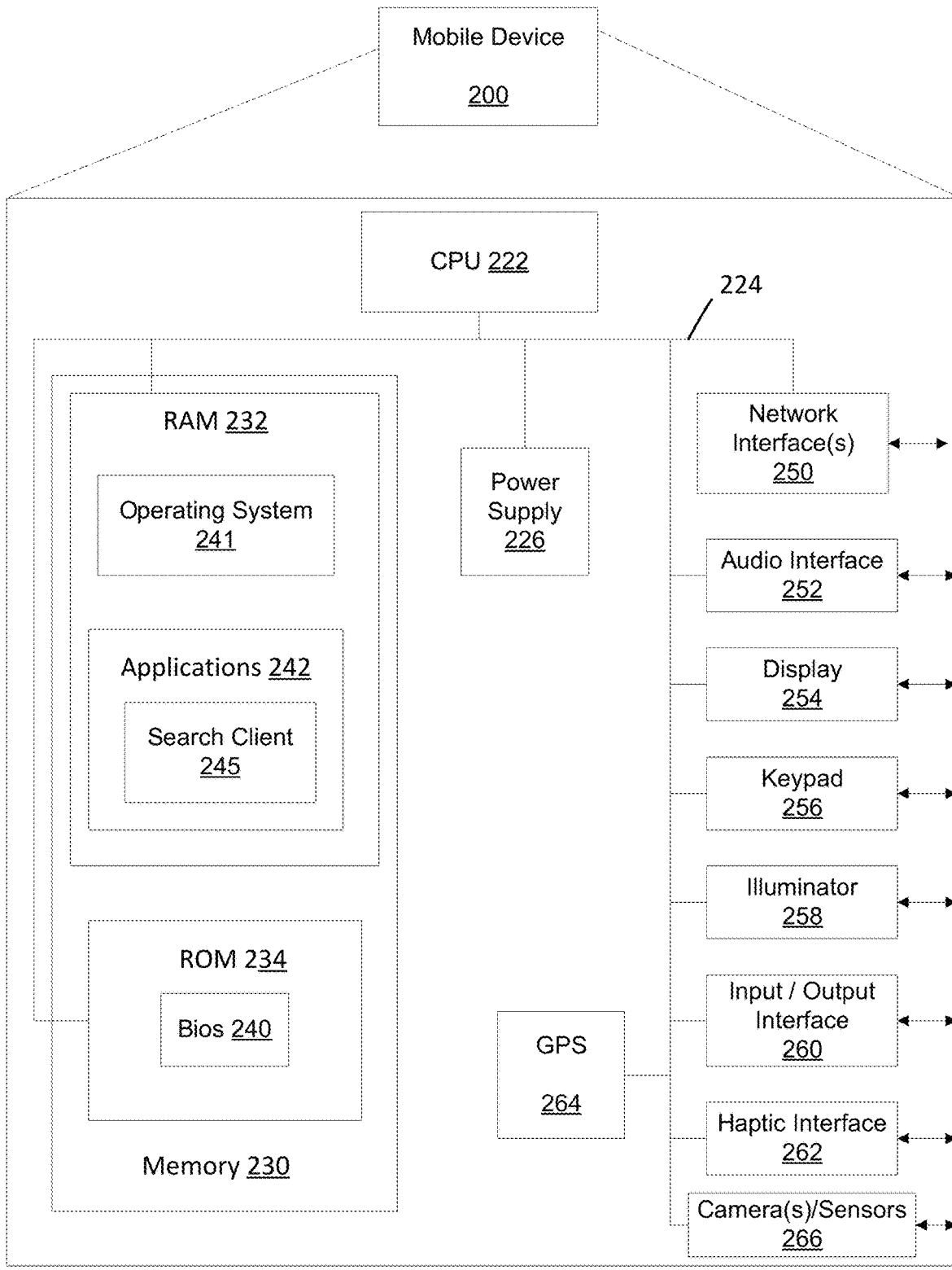
FIG. 2 depicts is a schematic diagram illustrating an example of client device in accordance with some embodiments of the present disclosure.

FIG. 2 is a schematic diagram illustrating a client device showing an example embodiment of a client device that may be used within the present disclosure. Client device 200 may include many more or less components than those shown in FIG. 2. However, the components shown are sufficient to disclose an illustrative embodiment for implementing the present disclosure. Client device 200 may represent, for example, client devices discussed above in relation to FIG. 1.

As shown in the figure, Client device 200 includes a processing unit (CPU) 222 in communication with a mass memory 230 via a bus 224. Client device 200 also includes a power supply 226, one or more network interfaces 250, an audio interface 252, a display 254, a keypad 256, an illuminator 258, an input/output interface 260, a haptic interface 262, an optional global positioning systems (GPS) receiver 264 and a camera(s) or other optical, thermal or electromagnetic sensors 266. Device 200 can include one camera/sensor 266, or a plurality of cameras/sensors 266, as understood by those of skill in the art. Power supply 226 provides power to Client device 200.

Client device 200 may optionally communicate with a base station (not shown), or directly with another computing device. Network interface 250 is sometimes known as a transceiver, transceiving device, or network interface card (NIC).

Audio interface 252 can be arranged to produce and receive audio signals such as, for example, the sound of a human voice. Display 254 can, but is not limited to, a include a touch sensitive screen arranged to receive input from an object such as a stylus or a digit from a human hand. Keypad 256 can comprise any input device arranged to receive input from a user. Illuminator 258 may provide a status indication and/or provide light.

Client device 200 also comprises input/output interface 260 for communicating with external devices. Input/output interface 260 can utilize one or more communication technologies, such as USB, infrared, Bluetooth™, or the like. Haptic interface 262 is arranged to provide tactile feedback to a user of the client device.

Optional GPS transceiver 264 can determine the physical coordinates of Client device 200 on the surface of the Earth.

In some embodiments however, Client device 200 may through other components, provide other information that may be employed to determine a physical location of the device, including for example, a MAC address, Internet Protocol (IP) address, or the like.

Mass memory 230 includes a RAM 232, a ROM 234, and other storage means. Mass memory 230 stores a basic input/output system ("BIOS") 240 for controlling low-level operation of Client device 200. The mass memory also stores an operating system 241 for controlling the operation of Client device 200

Memory 230 further includes one or more data stores, which can be utilized by Client device 200 to store, among other things, applications 242 and/or other information or data. For example, data stores may be employed to store information that describes various capabilities of Client device 200. The information may then be provided to another device based on any of a variety of events, including being sent as part of a header (e.g., index file of the HLS stream) during a communication, sent upon request, or the like. At least a portion of the capability information may also be stored on a disk drive or other storage medium (not shown) within Client device 200.

Applications 242 may include computer executable instructions which, when executed by Client device 200, transmit, receive, and/or otherwise process audio, video, images, and enable telecommunication with a server and/or another user of another client device. Applications 242 may further include search client 245 that is configured to send, to receive, and/or to otherwise process a search query and/or search result.

Having described the components of the general architecture employed within the disclosed systems and methods, the components' general operation with respect to the disclosed systems and methods will now be described below.

Figure 3:
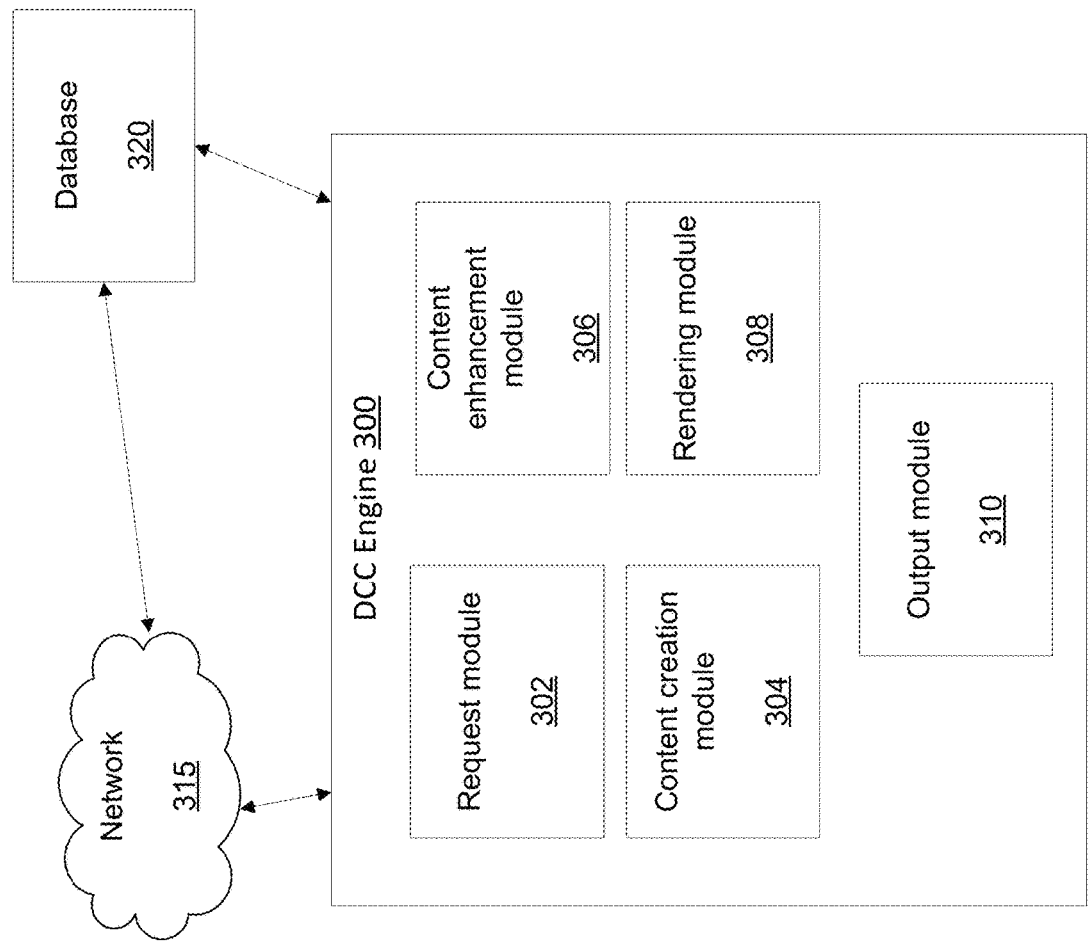
FIG. 3 is a block diagram illustrating components of an exemplary system in accordance with embodiments of the present disclosure.

FIG. 3 is a block diagram illustrating the components for performing the systems and methods discussed herein. FIG. 3 includes digital content creation (DCC) engine 300, network 315 and database 320. The DCC engine 300 can be a special purpose machine or processor and could be hosted by a network server (e.g., cloud web services server(s)), application server, content server, social networking server, web server, messaging server, search server, content provider, third party server, user's computing device, and the like, or any combination thereof.

According to some embodiments, DCC engine 300 can be embodied as a stand-alone application that executes on a networking server. In some embodiments, the DCC engine 300 can function as an application installed on the user's device, and in some embodiments, such application can be a web-based application accessed by the user device over a network. In some embodiments, the DCC engine 300 can be configured and/or installed as an augmenting script, program or application (e.g., a plug-in or extension) to another application or portal data structure.

The database 320 can be any type of database or memory, and can be associated with a content server on a network (e.g., content server, a search server or application server) or a user's device (e.g., device 101-104 or device 200 from FIGS. 1-2). Database 320 comprises a dataset of data and metadata associated with local and/or network information related to users, services, applications, content and the like.

In some embodiments, such information can be stored and indexed in the database 320 independently and/or as a linked or associated dataset. An example of this is look-up table (LUT). As discussed above, it should be understood that the data (and metadata) in the database 320 can be any type of information and type, whether known or to be known, without departing from the scope of the present disclosure.

According to some embodiments, database 320 can store data for users, e.g., user data. According to some embodiments, the stored user data can include, but is not limited to, information associated with a user's profile, user interests, user behavioral information, user patterns, user attributes, user preferences or settings, user demographic information, user location information, user biographic information, and the like, or some combination thereof.

In some embodiments, the user data can also include user device information, including, but not limited to, device identifying information, device capability information, voice/data carrier information, Internet Protocol (IP) address, applications installed or capable of being installed or executed on such device, and/or any, or some combination thereof. It should be understood that the data (and metadata) in the database 320 can be any type of information related to a user, content, a device, an application, a service provider, a content provider, whether known or to be known, without departing from the scope of the present disclosure.

According to some embodiments, database 320 can store data and metadata associated with users, searches, actions, clicks, conversions, recommendations, messages, images, videos, text, products, items and services from an assortment of media, applications and/or service providers and/or platforms, and the like. Accordingly, any other type of known or to be known attribute or feature associated with a user, message, data item, media item, login, logout, website, application, communication (e.g., a message) and/or its transmission over a network, a user and/or content included therein, or some combination thereof, can be saved as part of the data/metadata in datastore 320.

As discussed above, with reference to FIG. 1, the network 315 can be any type of network such as, but not limited to, a wireless network, a local area network (LAN), wide area network (WAN), the Internet, or a combination thereof. The network 315 facilitates connectivity of the DCC engine 300, and the database of stored resources 320. Indeed, as illustrated in FIG. 3, the DCC engine 300 and database 320 can be directly connected by any known or to be known method of connecting and/or enabling communication between such devices and resources.

The principal processor, server, or combination of devices that comprise hardware programmed in accordance with the special purpose functions herein is referred to for convenience as DCC engine 300, and includes request module 302, content creation module 304, content enhancement module 306, rendering module 308 and output module 310. It should be understood that the engine(s) and modules discussed herein are non-exhaustive, as additional or fewer engines and/or modules (or sub-modules) may be applicable to the embodiments of the systems and methods discussed. The operations, configurations and functionalities of each module, and their role within embodiments of the present disclosure will be discussed below.

Figure 4:
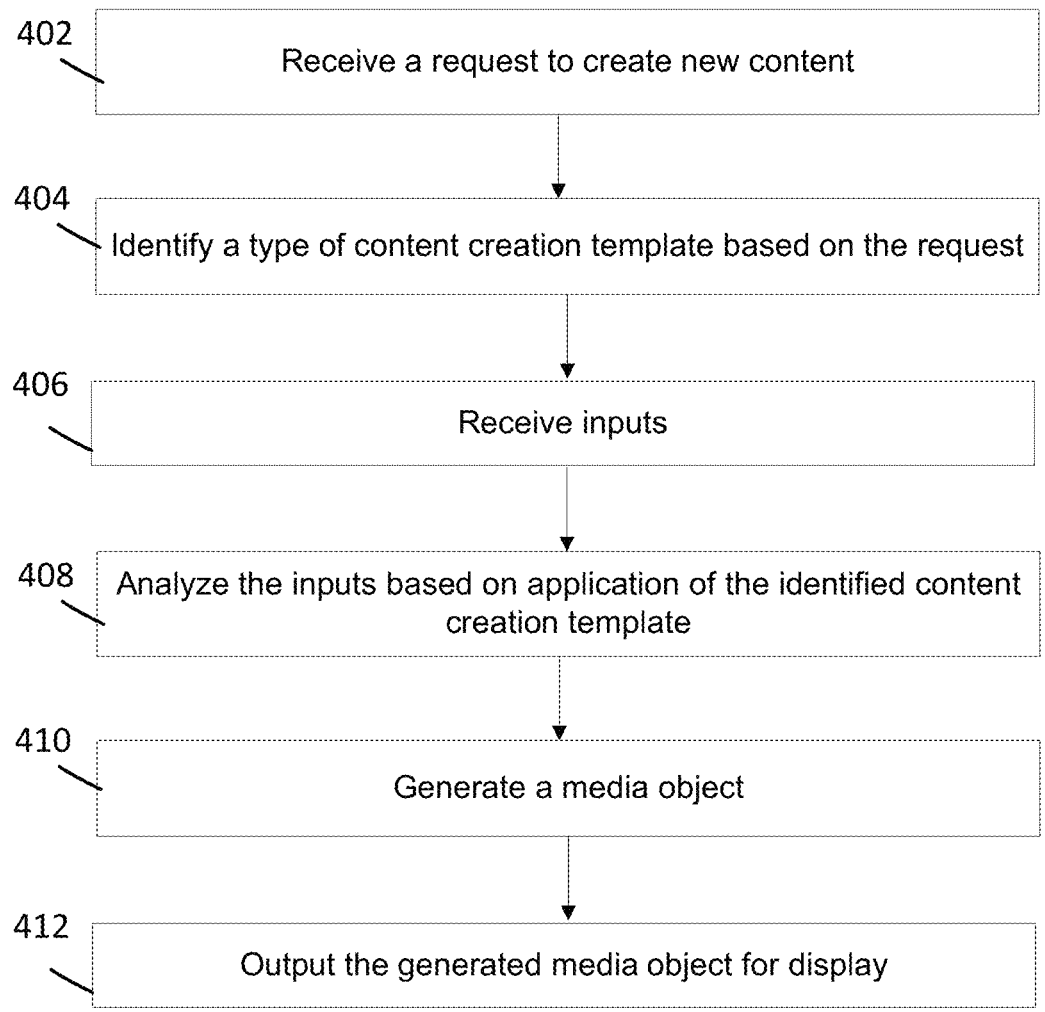
FIG. 4 is a block diagram illustrating an exemplary data flow for creating content in accordance with some embodiments of the present disclosure.

Turning to FIG. 4, Process 400 is disclosed which details non-limiting example embodiments of the disclosed systems and methods. According to some embodiments, Process 400 provides mechanisms for creating a new media object by using a content creation template, as discussed above.

According to some embodiments, Steps 402-404 of Process 400 can be performed by request module 302 of DCC engine 300; Steps 406-410 can be performed by content creation module 304; and Step 412 can be performed by output module 310.

Process 400 begins with Step 402 where a request to create a new content item is received. In some embodiments, the request can correspond to the creation of an entirely new media object. In some embodiments, the request can comprise specification information related to certain types of data inputs from which the new media object shall be created. In some embodiments, the request can be automatically triggered, as it can correspond to an event; and in some embodiments, the request can be in response to a user request.

In some embodiments, the request can further include information indicating where the media object will be displayed, shared, sent, posted or otherwise disseminated on a network (referred to as the "serving environment" or "output location", used interchangeably). For example, the request can indicate that the media object to be generated will be displayed within an application on the user's device, or posted to a social media page of another user, and the like. Thus, as discussed below, the capabilities associated with the destination of the created media object can impact how the media object is formatted upon its generation (as in Step 410, discussed below, or after its generation, as discussed in relation to FIG. 6, below).

In Step 404, a type of content creation template is identified based on the request. In some embodiments, engine 300 can analyze the request and determine that a particular type of media object is being requested as being created, and as a result, the content creation template that enables the creation of that type of template can be identified. In some embodiments, the identified template can be retrieved from a collection of templates (e.g., database 320). In some embodiments, the identified template can be created (and in some embodiments, this may occur when it is determined that a proper or required content creation template is no available or already created).

In Step 406, inputs for creation of the media object are received, determined or otherwise identified. In some embodiments, the inputs can be determined, derived, extracted or identified from the request in Step 402. For example, the request in Step 402 may request a 3D representation (or simulation) of a football game be created; therefore, the inputs can correspond to the data related to the plays of the game, score the game and players of certain plays of the game, and the like. An example of this is discussed below at the conclusion of the discussion of the Process 400 discussion.

In Step 408, engine 300 analyzes the received input data based on the application of the identified creation template, and determines a rendering for the requested media object. According to some embodiments, as mentioned above, the identified creation template can reference or have defined therein sub-templates (e.g., ML/AI programs) that correspond to generating particular types and/or portions of content for the media object from particular types of input data (e.g., manipulate the input data into the media object). For example, as discussed below in the non-limiting example, data related to a position of the football field where a play occurs can correspond to a layout of the 3D representation (e.g., a content portion that displays the football field); therefore, a sub-template for generating a simulation of a football field can be called and executed on the corresponding data (e.g., an depiction of the play on the provided field).

In Step 410, based on the templated analysis of the input data, the media object is generated and stored (e.g., in database 320). As discussed above, the media object can be formatted as an image, video, multimedia object, and the like, or some combinations thereof. In some embodiments, the media object can be output as a 3D media object. In some embodiments, the media object can be output as a 2D media object. As discussed above and below in more detail in relation to FIG. 6, the initial formatting of the media object can be based on the request (from Step 402) and it can be modified prior to its display or dissemination over a network. As discussed below, such modification (or format conversion) can be based on display and/or rendering capabilities of the serving environment in which the media object is to be consumed.

In Step 412, the generated media object can be output for display to the serving environment. In some embodiments, the output can correspond to the media object being displayed on a web page, billboard, as a social media post, within a message, as supplemental content, as an overlay, and the like, or any other type of known or to be known manner in which digital media content can be viewed by a user and/or consumed by a set of users.

Turning now to a non-limiting example of a content creation template, a "PlayAR" content creation template is discussed as a reference for the operations of Process 400. As mentioned above, the details and operations of the PlayAR template are non-limiting and should not limit the scope of how other content creation templates operate, as the PlayAR template is provided as an example of how input data can be compiled into a newly created media object. Thus, PlayAR is an example template that enables the creation of a 3D virtual representation of a play of a real football game (e.g., NFL® game).

By way of a non-limiting example, the PlayAR template can be called in response to a request that is automatically triggered in response to a play being completed. The request indicates that the play has completed and includes, for example, at least the following information: a) current score the game (as text); b) player information for each player involved in the play, which includes: i) player name (as text), ii) player image (e.g., headshot as transparent PNG, for example), iii) player position (e.g., (x,y) coordinates of the player during the play, as a list of (x,y) coordinates over time during the play); c) team logos (e.g., transparent PNGs, for example); and d) sponsored image (e.g., an image of the sponsor of the game, if necessary, as JPG or PNG, for example).

According to some embodiments, engine 300 can use the PlayAR template by analyzing the input data to generate the media object 3D rendering of the play. For example, based on the input data, sub-templates "layout" and "animation" from the PlayAR template can be called. In some embodiments, the layout sub-template can analyze the input data related to the score, team logos, and sponsor image, and generate a 3D football field. Then, in some embodiments, the "animation" template can analyze the input data related to the players information, and compile a rendering of their movements during the play that is to be overlaid the 3D football field.

Thus, a simulated media object rendering of a real football play is generated. In some embodiments, as discussed above, for example, if the rendering is being provided for display via the Yahoo! Sports® App, then it can be compiled as a 3D model and exported or provided for display and rendering.

Figure 5:
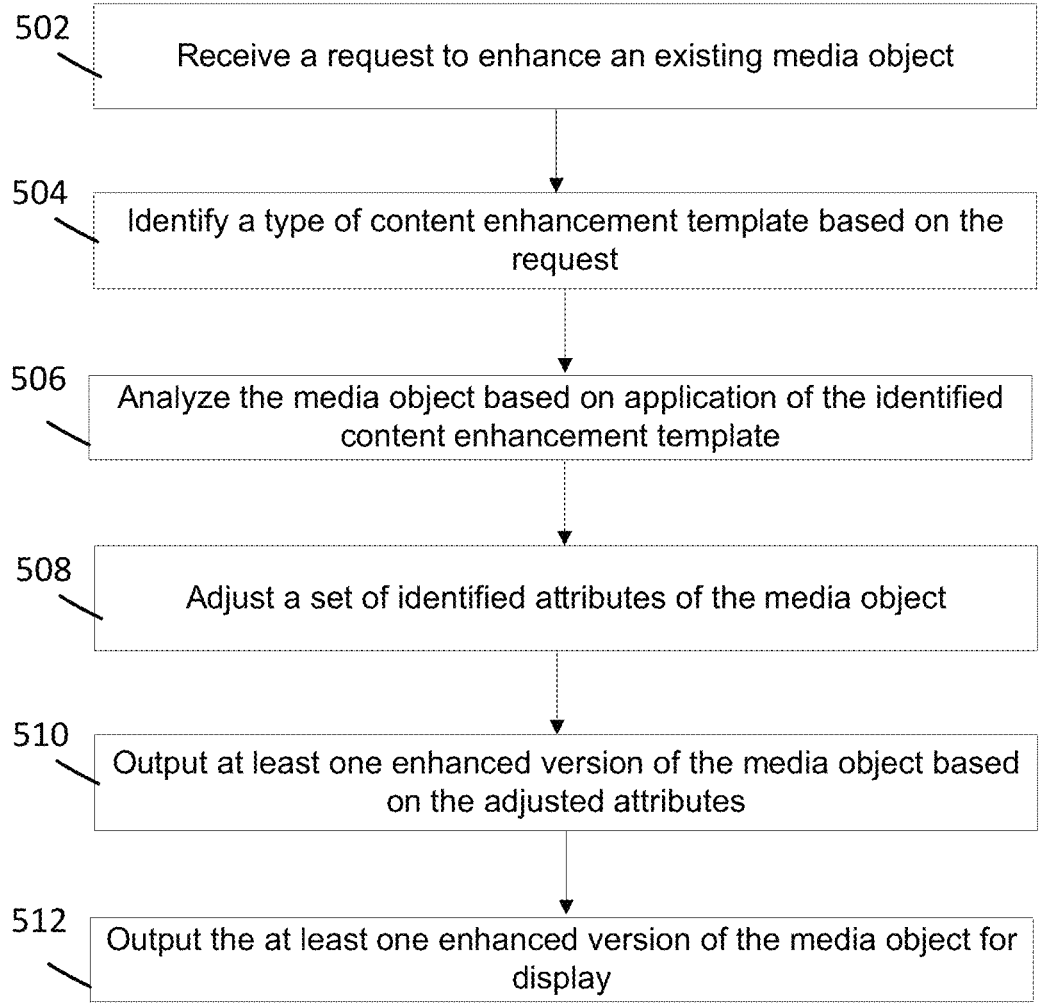
FIG. 5 is a block diagram illustrating an exemplary data flow for performing content enhancement in accordance with some embodiments of the present disclosure.

Turning to FIG. 5, Process 500 provides mechanisms for enhancing (or modifying) an existing media object by using a content enhancement template, as discussed above.

According to some embodiments, Steps 502-504 of Process 500 can be performed by request module 302 of DCC engine 300; Steps 506-510 can be performed by content enhancement module 306; and Step 512 can be performed by output module 310.

Process 500 begins with Step 502 where a request to enhance an existing media object is received by engine 300. In some embodiments, the request can be automatically triggered based on the detection of an event (e.g., a user uploads or requests to upload a media object). In some embodiments, the request can be triggered by a dedicated request by the user.

According to some embodiments, the request in Step 502 includes information related to, but not limited to, a media object(s), a type of modification(s), values of modifications (e.g., which type of modifications are being requested—for example, increase resolution), attributes or parameters to modify, and/or destination of the enhanced media object (e.g., where is it being uploaded, shared, sent or posted to—serving environment), and the like, or some combination thereof. In some embodiments, the request can include the media object, and in some embodiments, the request can reference the media object (e.g., provide a URL associated with where to locate the media object, for example).

In some embodiments, therefore, the request can include information indicating a level (or intensity) as to how and/or how much of an enhancement (or modification) of the media object is to be performed. In some embodiments, this identified level can be provided via an input value provided by a user, selected by a user, or derived based on the requested modifications input by the user.

In Step 504, engine 300 identifies a type of content enhancement template based on the request. In a similar manner discussed above in relation to Step 404 of Process 400, engine 300 can analyze the request and determine that a particular type of media object is being requested to be modified in a particular manner. As such, engine 300 can identify an enhancement template from a database. In some embodiments, in a similar manner as discussed above, the required enhancement template can be created as a result of the request.

According to some embodiments, in a similar manner as discussed above, the identified template can comprise references to and/or include sub-templates (or programs) that, when executed, can cause the modification of the media object according to the specifications provided by the request.

In Step 506, engine 300 analyzes the media object (identified in request 502) based on application of the identified content enhancement template (and its sub-template(s), from Step 504); and as a result, in Step 508, the media object's attributes are adjusted or modified according to the specifications set forth in the request.

According to some embodiments of Steps 506-508, in a similar manner to the content creation template discussion above, the enhancement template's sub-templates can be called for specific modifications and/or specific types of parameters. For example, a first sub-template may be called to perform one set of modifications to particular parameters and a second sub-template may be called for another set of modifications and/or other set of parameters.

As a result of the processing performed by engine 300 in Steps 506-508, in Step 510, engine 300 outputs at least one enhanced version of the media object. In some embodiments, engine 300 can output a version that is compatible with the serving environment. In some embodiments, the engine 300 can output the version requested by the user, whereby another version compatible with a serving environment can also be created. For example, a 3D media object and a 2D media object version can be created as a result of Step 510.

Then, in Step 512, the enhanced media object(s) is provided to the requested serving environment. Processing of Step 512 can be performed in a similar manner as discussed above in relation to Step 412 of Process 400, discussed above, and Process 600 of FIG. 6 below.

Turning now to a non-limiting example of a content enhancement filter's application to a media object, the discussion here will focus on an example "Realism" template. In a similar manner to the PlayAR filter discussed above, the Realism template is provided as an example to illustrate example embodiments of the operations of Process 500, and should not be construed as a limiting configuration and/or enhancement operation.

In some embodiments, the Realism template is a type of content enhancement template that modifies a media object's attributes so that the display of the media object appears "more real" or in a higher quality that originally associated with the un-enhanced media object.

For example, the Realism template can include, but not limited to, a "texture-up" sub-template and an "ambient occlusion" sub-template, which can be processed in sequential order. For example, the texture-up sub-template can modify the media object's resolution (which can be performed if it is determined to be below a particular resolution threshold value). Thus, for example, a value of the media object's texture can be improved through this sub-template's execution. Further, for example, the ambient occlusion sub-template can modify surface lighting to improve the intensity and/or contrast of the displayed objected within the media object's display. In some embodiments, the ambient occlusion sub-template is applied to the modified version of the media object that was subject to the texture-up sub-template.

As a result of the Realism filter's application, an enhanced version(s) of the media object can be output, as mentioned above. For example, various formats, dimensions and/or resolutions can be exported to a serving environment and/or for further rendering application (as discussed below in relation to FIG. 6).

Figure 6:
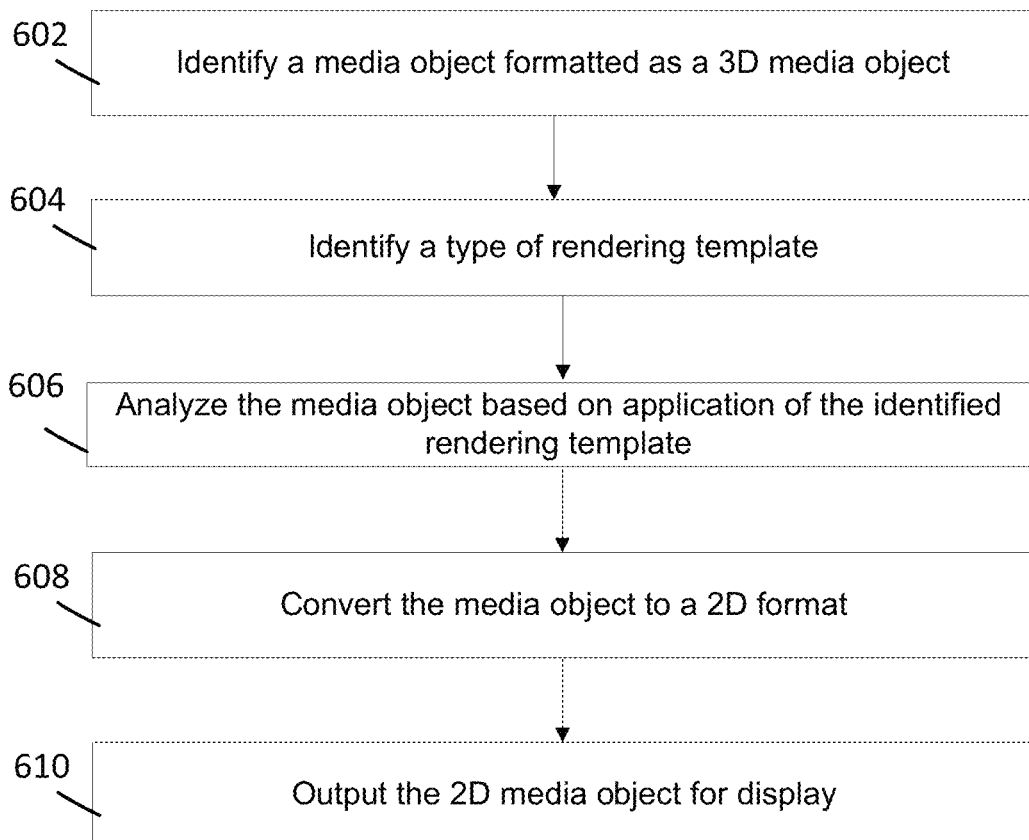
FIG. 6 is a block diagram illustrating an exemplary data flow for performing modified rendering of content in accordance with some embodiments of the present disclosure.

Turning to FIG. 6, Process 600 is disclosed which details non-limiting example embodiments for performing rendering of media objects via a rendering template, as discussed above. In some embodiments, Process 600 can be executed in order to properly format a media object for the serving environment in which it is to be consumed by users (e.g., which device and/or web interface is being used to rendering the content).

According to some embodiments, Steps 602-604 of Process 500 can be performed by request module 302 of DCC engine 300; Steps 606-608 can be performed by rendering module 308; and Step 610 can be performed by output module 310.

Process 600 begins with Step 602 where a media object is identified. In some embodiments, the identified media object can be any type of media object identifiable from a network and/or uploaded by a user. In some embodiments, the media object can be the media objects output from Processes 400 and/or 500 prior to their distribution over a network. In some embodiments, Step 602 can involve a request to render a media object within a particular serving environment, in a similar manner as discussed above, whereby the modification of the format can be based on the serving environment's capabilities.

For purposes of the discussion, Process 600 will be discussed with reference to an originating 3D formatted media object and its subsequent conversion to a 2D object format; however, it should not be construed as limiting, as any type of formatted media object can be taken as input by a rendering template and modified accordingly, as discussed herein. For example, the media object identified in Step 602 can be a 2D object, which is then formatted to a 3D object, in a similar manner as discussed below. Similarly, a video media object can be formatted to a collection of images via a particular type of applied rendering template, in a similar manner as discussed above. Therefore, without departing from the scope of the instant disclosure, it should be understood that varying types of rendering conversion can be performed via the technical operations of the disclosed DCC engine 300.

In Step 604, a type of rendering template is identified. This can be performed in a similar manner as discussed above in relation to the identification of the content creation and/or content enhancement templates (e.g., Steps 404 and 504, respectively). For example, the media object from Step 602 can be analyzed, and based on its attributes, it is determined that it is a 3D media object. Thus, a rendering template for converting a media object from a 3D format to a 2D format can be identified. In some embodiments, the serving environment for where the media object is to be output can dictate its conversion and the type of rendering template, as discussed above.

In Step 606, the media object can be analyzed based on the application of the identified rendering template (and its referenced sub-templates); and as a result, in Step 608, the media object can be converted to another format (e.g., 2D format). The application of the rendering template, the calls and execution of the sub-templates and the modification of the media object can be performed in a similar manner in relation to at least the adjustment of parameters as discussed above for Process 500.

Then, in Step 610, the converted media object is output for the display in the requested serving environment. This is performed in a similar manner as discussed above in relation to Step 412 and Step 512.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium for execution by a processor. Modules may be integral to one or more servers, or be loaded and executed by one or more servers. One or more modules may be grouped into an engine or an application.

For the purposes of this disclosure the term "user", "subscriber" "consumer" or "customer" should be understood to refer to a user of an application or applications as described herein and/or a consumer of data supplied by a data provider. By way of example, and not limitation, the term "user" or "subscriber" can refer to a person who receives data provided by the data or service provider over the Internet in a browser session, or can refer to an automated software application which receives the data and stores or processes the data.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than, or more than, all of the features described herein are possible.

Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

What is claimed is:

1. A method comprising:
receiving, over a network, by a device, a request to create media object, the request comprising information related to a specification for creation of the media object and information related to an output location for the created media object;
analyzing, by the device, the request, and identifying, based on the analysis, a content creation template, the identified content creation template being a type of template configured for creation of new content such as the requested media object;
analyzing, by the device, the specification information based on an application of the identified content creation template; and
generating, by the device, based on the analyzed specification information, the media object.

2. The method of claim 1, wherein the identified content creation template comprises at least one sub-template, the at least one sub-template comprising information referencing a program for manipulating the specification information into the media object.

3. The method of claim 2, further comprising:
analyzing, by the device, the specification information by executing the program identified by the sub-template of the identified content creation template, wherein the generation of the media object is based on an output of the execution of the program.

4. The method of claim 1, further comprising:
identifying, by the device, a rendering template that is a type of template different from a content creation template type, the rendering template comprising functionality for modifying a format of the media object in accordance with capabilities of the output location; and analyzing, by the device, the output location information based on an application of the rendering template, wherein the generation of the media object is further based on the analyzed output location information.

5. The method of claim 4, further comprising:
modifying, by the device, the media object from a first format to a second format based on application of the rendering template, wherein the second format is a format that is renderable by a device associated with the output location.

6. The method of claim 1, further comprising:
communicating, over the network by the device, the generated media object to a device associated with the output location, the communicated media object being a format that corresponds to a format renderable by the device associated with the output location.

7. The method of claim 1, further comprising:
detecting, by the device, an event, wherein the request is automatically received based on the detection of the event.

8. A method comprising:
receiving, over a network, at a device, a request to modify a media object, the request comprising information related to the modification of the media object and information related to an output location for the modified media object;
analyzing, by the device, the request, and identifying, based on the analysis, a content enhancement template, the identified content enhancement template being a type of template configured for content enhancement such as the requested modification of the media object, the content enhancement template comprising at least one sub-template that references an executable program for performing the requested modification;
analyzing, by the device, the media object, the analysis comprising applying the identified content enhancement template and executing the referenced program based on the modification information;
modifying, by the device, at least one parameter value of the media object based on the analysis of the media object; and
communicating, by the device over the network, the modified media object to the output location, the modified media object being a format that is renderable by a device associated with the output location.

9. A non-transitory computer-readable storage medium tangibly encoded with computer-executable instructions, that when executed by a processor associated with a device, performs a method comprising:
receiving, over a network, by the device, a request to create a media object, the request comprising information related to a specification for creation of the media object and information related to an output location for the created media object;
analyzing, by the device, the request, and identifying, based on the analysis, a content creation template, the identified content creation template being a type of template configured for creation of new content such as the requested media object;
analyzing, by the device, the specification information based on an application of the identified content creation template; and
generating, by the device, based on the analyzed specification information, the media object.

10. The non-transitory computer-readable storage medium of claim 9, wherein the identified content creation template comprises at least one sub-template, the at least one sub-template comprising information referencing a program for manipulating the specification information into the media object.

11. The non-transitory computer-readable storage medium of claim 10, further comprising:
analyzing, by the device, the specification information by executing the program identified by the sub-template of the identified content creation template, wherein the generation of the media object is based on an output of the execution of the program.

12. The non-transitory computer-readable storage medium of claim 9, further comprising:
identifying, by the device, a rendering template that is a type of template different from a content creation template type, the rendering template comprising functionality for modifying a format of the media object in accordance with capabilities of the output location; and
analyzing, by the device, the output location information based on an application of the rendering template, wherein the generation of the media object is further based on the analyzed output location information, wherein the analysis of the output location comprises:
modifying, by the device, the media object from a first format to a second format based on application of the rendering template, wherein the second format is a format that is renderable by a device associated with the output location.

13. The non-transitory computer-readable storage medium of claim 9, further comprising:
communicating, over the network by the device, the generated media object to a device associated with the output location, the communicated media object being a format that corresponds to a format renderable by the device associated with the output location.

14. The non-transitory computer-readable storage medium of claim 9, further comprising:
detecting, by the device, an event, wherein the request is automatically received based on the detection of the event.

15. A device comprising:
a processor configured to:
receive, over a network, a request to create a media object, the request comprising information related to a specification for creation of the media object and information related to an output location for the created media object;
analyze the request, and identify, based on the analysis, a content creation template, the identified content creation template being a type of template configured for creation of new content such as the requested media object;
analyze the specification information based on an application of the identified content creation template; and
generate, based on the analyzed specification information, the media object.

16. The device of claim 15, wherein the identified content creation template comprises at least one sub-template, the at least one sub-template comprising information referencing a program for manipulating the specification information into the media object.

17. The device of claim 16, wherein the processor is further configured to:
analyze the specification information by executing the program identified by the sub-template of the identified content creation template, wherein the generation of the media object is based on an output of the execution of the program.

18. The device of claim 15, wherein the processor is further configured to:
   identify a rendering template that is a type of template different from a content creation template type, the rendering template comprising functionality for modifying a format of the media object in accordance with capabilities of the output location; and
   analyze the output location information based on an application of the rendering template, wherein the generation of the media object is further based on the analyzed output location information, wherein the processor is further configured to:
   modify the media object from a first format to a second format based on application of the rendering template, wherein the second format is a format that is renderable by a device associated with the output location.

19. The device of claim 15, wherein the processor is further configured to:
   communicate, over the network, the generated media object to a device associated with the output location, the communicated media object being a format that corresponds to a format renderable by the device associated with the output location.

\* \* \* \* \*